March 30, 1943. F. M. HILDEBRANDT 2,315,422
TREATMENT OF MOLASSES FERMENTATION SOLUTIONS
Filed Feb. 14, 1941
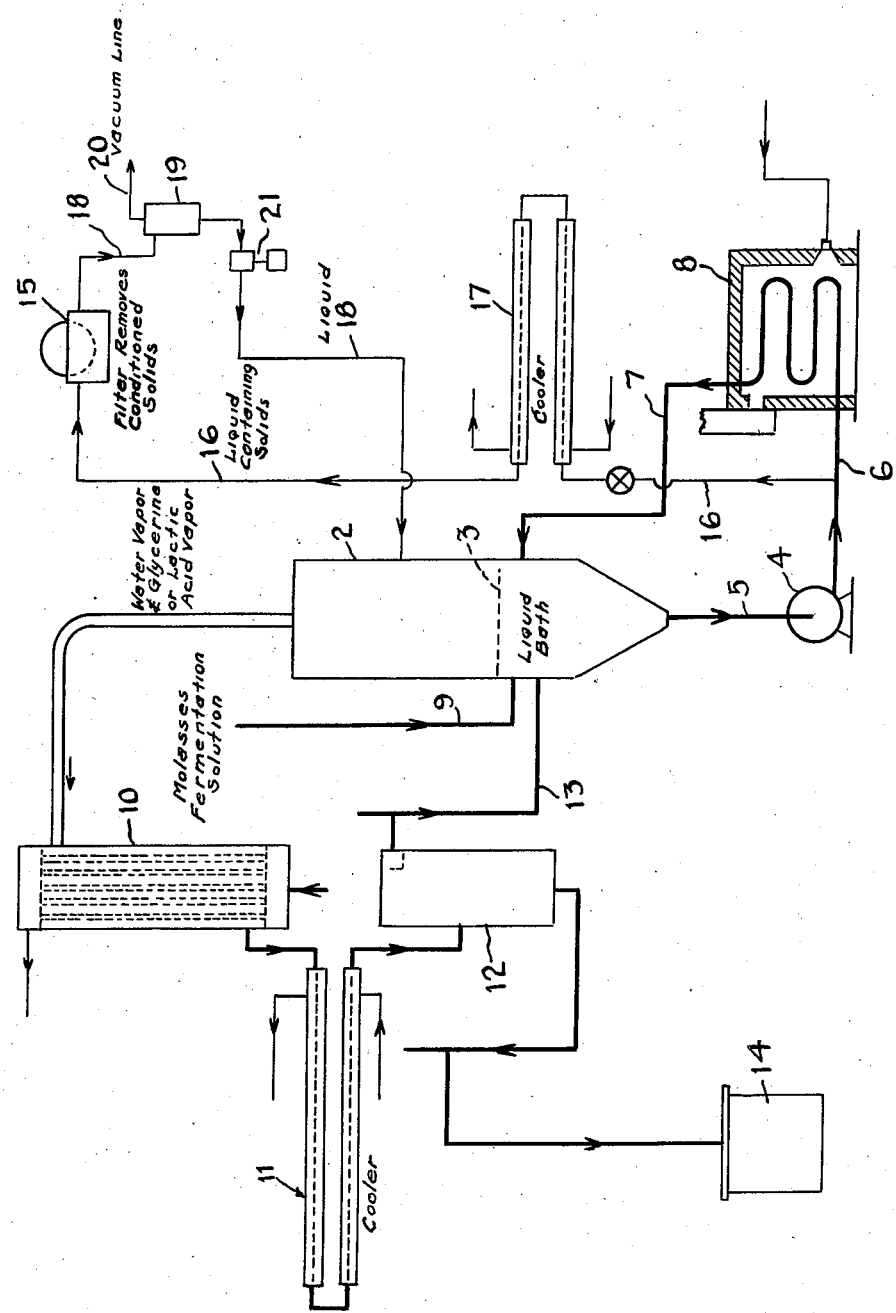
INVENTOR.
Frank M. Hildebrandt
BY Patented Mar. 30, 1943

2,315,422

UNITED STATES PATENT OFFICE 2,315,422

TREATMENT OF MOLASSES FERMENTATION SOLUTIONS

Frank M. Hildebrandt, Baltimore, Md., assignor to U. S. Industrial Alcohol Co., New York, N. Y., a corporation of West Virginia Application February 14, 1941, Serial No. 378,884

4 Claims. (Cl. 202—74)

This invention is a process of treating cane molasses fermentation solutions whereby certain high-boiling organic substances heretofore difficult to recover from such solutions are recoverable in a facile manner, and whereby substances that would prevent or interfere with recoveries, or clog the system, are conditioned so that they do not interfere and themselves offer a valuable product.

The dissolved, or dissolved and suspended solids of these solutions include various non-volatile organic compounds and bodies as well as those of inorganic nature, and it is these substances which cause difficulty in certain operations by reason of their tendency to agglomerate, to adhere to surfaces of apparatus and pipes, and to cause clogging and local overheating.

The invention is applicable to the treatment of molasses still-residue, namely the dealcoholized fermentation solution from yeast fermentation of a molasses mash. In the usual fermentation for ethyl alcohol these still residues contain a quantity of glycerine amounting to about 3% of the fermented sugar, but this glycerine has not been commercially recoverable, and in the aggregate enormous quantities of glycerine have gone to waste in the still residues. Commonly these still residues are disposed of by running them into rivers or other waters.

Not only does the ordinary molasses still-residue contain a small amount of glycerine: it is known to be possible to increase this content readily to 14% of the sugar fermented or even to higher percentages under special conditions. Again, however, it has not been economical or practical to recover the glycerine.

I have discovered that by feeding the molasses still residue to a body of a suitable liquid, maintained at a sufficiently high temperature, not merely will the glycerine and water be flashed off together, but the solids, which remain in the hot bath, will be finely-divided, non-agglomerating, non-adherent, and when subsequently freed of bath liquid substantially non-hygroscopic. Consequently the operation can be conducted successfully, whether for recovery of glycerine or of solids, or both. The solid product contains both the potash and much of the nitrogen of the still-waste and is a valuable fertilizer material.

The treatment is equally applicable to molasses solutions which have been fermented by the action of micro-organisms to produce lactic acid. The problem created by the presence of the organic molasses solids is the same as in the case of the still-residues from ethanol or ethanol-glycerol fermentations, and substantially the same order of heating will condition the solids of the lactic fermentation solutions in the manner and to the ends that have been described.

Lactic acid, which like glycerol has a boiling point above the boiling point of water, is flashed off with the water, the solids are altered in composition and physical tendencies and separate as discrete particles in the bath, and from which they are readily removable.

The bath temperatures to be employed in the process of the invention are of the order of 190°–280° C., and preferably of the order of 230°–280° C. In order properly to condition the solids and flash off the liquids the temperature should be kept above 190° C. and better still above 200° C. For best recoveries of glycerine or lactic acid, temperatures well above 200° C. are required. In my experience I have found temperatures of about 250° C. to be satisfactory as regards both the solids and the high-boiling organic constituent.

If the feed to the process be the still-residue of an ethyl alcohol fermentation, it may or may not be a primary object to recover glycerine. For recovery especially of glycerine, or of lactic acid in the other application of the invention, the temperature of the bath should not be so high as to cause undue decomposition of the glycerine or lactic acid.

In order to maintain the temperature of the bath it is preferable to circulate the bath liquid to and from a capacious treating vessel, through an external heater. In this connection I have found a simple way of removing the solids from the treating vessel, which consists in taking off a side stream to a filter, said side stream preferably by-passing the heater.

The accompanying drawing is a diagrammatic illustration of apparatus for carrying out the invention.

A treating vessel or still 2 contains a body of heat-transfer liquid 3, which is circulated by a pump 4 through pipes 5, 6, 7 from the treating vessel to a heating coil in a furnace 8, and back to the vessel.

The molasses still-residue, or slop, preferably concentrated to about 50% solids content, is introduced into contact with the hot bath through a pipe 9. The feed is preferably injected into the bath at a substantial distance below the surface of the latter. It is not necessary to provide special means for spraying or atomizing the feed solution, since the explosive effect of sudden vaporization breaks it up into small droplets, with the result that the solids separate in fine particles.

The bath liquid should be one that is substantially heat-stable, substantially non-miscible with water, substantially a non-solvent of the solids, substantially non-reactive with the constituents of the feed, and has a boiling point higher than the temperature at which the flash distillation is effected. For the recovery of glycerine or lactic acid it should be substantially immiscible with the product in question. It should have a specific gravity such that the solids produced do not float on top of the bath but settle or remain in the body of the liquid in order that their removal may be accomplished in the manner described. A mineral oil is preferred. An oil that has been found satisfactory has the following characteristics:

|  | Degrees centigrade |
|---|---|
| Initial boiling point at atmospheric pressure | 305 |
| 50% | 337 |
| End point | 377 |
| Gravity | 0.874 at 30 |

In the case of still-residue, the vapors of glycerine and water are flashed off on contact of the feed with the hot oil, and enter the condenser 10 at a temperature upwards of 180° C., and preferably upwards of 200° C. The condensate goes through the cooler 11 into the decanting vessel 12. The upper layer consisting of oil is put back into the treating vessel 2 through pipe 13, and the lower layer, which contains the water of the feed together with the glycerine and certain impurities, is drawn from the decanter to the receiver 14, to be subsequently concentrated and purified in any desired manner.

The solids, conditioned in the treating vessel 2 as heretofore described, may be removed from the vessel and freed of the bath liquid in a number of ways. Much advantage, however, is realized by drawing off a small side stream of the liquid, carrying the solids in suspension, to a filter 15, preferably of the continuous, rotary, vacuum type. This stream, which does not pass through the furnace, may be taken off from the pipe 6 at a point between the main circulating pump 4 and the furnace. It passes through a valved line 16 and a cooler 17 to the filter, from which the clear liquid returns to the still or treating vessel through a line 18, a receiver 19 having a vacuum connection 20, and a pump 21. This method of withdrawing solids results in a build-up of solids in the bath liquid circulating through the still until an equilibrium is reached, at which the solids are withdrawn at the same rate as they are formed. The value per minute of the side stream need be no greater than 5% of the total oil circulated.

The solid product, when freed of bath liquid in the filter or otherwise, is a dark, substantially non-hygroscopic powder, containing on the dry basis about 14% to 15% potash and about 2.25% nitrogen. This end-product has been shown by actual tests to be a valuable fertilizer ingredient. When mixed with other materials, mainly phosphates, it becomes a complete fertilizer.

In the treatment of molasses lactic-acid fermentation solutions, the lactic solution is fed through the pipe 9, the vapors of lactic acid and water are flashed off and go to the condenser 10, the residual molasses solids are conditioned in the bath, and when removed and freed of the heat-transfer liquid constitute a solid product similar to that from the ethyl alcohol still-residue or slop. It is desirable to supply a small current of superheated steam to sweep the lactic acid vapors out of the vessel 2.

This application is a continuation in part of my application Serial No. 235,696, filed October 18, 1938.

I claim:

1. The process of treating a molasses fermentation solution which contains a substantial proportion of solid substances that tend to agglomerate and to adhere to surfaces of apparatus and pipes of treating equipment causing clogging and local overheating, which process comprises introducing the molasses fermentation solution into a vessel containing a body of heat transfer liquid that has a boiling point higher than the temperature used in the process and that is non-reactive with said solution, flashing off certain volatile substances of the solution and changing the physical properties of said solids into non-agglomerating, non-adherent finely-divided material by mixing said solids with the liquid in the vessel and maintaining the temperature of the liquid above 190° C., removing the physically-changed solids from said vessel with a portion of the heat transfer liquid, and subsequently separating the solids from the heat transfer liquid to secure a product that is fertilizer material.

2. The process of treating a molasses fermentation solution as described in claim 1 in which the heat transfer liquid is organic and is maintained at a temperature between 190° and 280° C.

3. The process of heat treating a molasses fermentation solution containing a substantial proportion of solid substances that tend to agglomerate and to adhere to surfaces of apparatus and pipes of treating equipment causing clogging and local overheating, which process comprises the following steps: introducing the molasses fermentation solution into a vessel containing a body of organic heat transfer liquid non-reactive with the fermentation solution and having a boiling point higher than the temperature of the process, said heat transfer liquid being maintained at a temperature sufficiently high to flash off the volatiles and to put the solids into a non-agglomerating and non-adhesive condition, flashing off the volatile substances in the said solution including the water and other volatiles boiling above the boiling point of water and recovering the flashed-off materials by condensation, removing the physically changed solids from the treating vessel with a portion of the heat transfer liquid, and subsequently separating the solids from the heat transfer liquid to secure a product that is a fertilizer material.

4. The process of treating the still-residue from an ethyl alcohol fermentation of molasses, which residue contains water, glycerine, and a substantial proportion of solid substances that tend to agglomerate and to adhere to the surfaces of treating apparatus, said process comprising introducing the still-residue into a vessel containing a body of heat transfer liquid that is non-reactive with the still-residue, flashing off the water and glycerine of the solution and condensing them in another vessel that is in communication with the vessel containing the heat transfer liquid, changing the physical properties of the solids by mixing said solids with the heat transfer liquid and maintaining the temperature of the liquid above 190° C., removing the physically-changed solids from said vessel with a portion of the heat transfer liquid, and subsequently separating the solids from the heat transfer liquid to secure a product that is fertilizer material.

FRANK M. HILDEBRANDT.